(12) United States Patent
Heiss, Jr.

(10) Patent No.: US 7,975,631 B2
(45) Date of Patent: Jul. 12, 2011

(54) COMBINED AGRICULTURAL MACHINE

(76) Inventor: Andreas Heiss, Jr., Pförring-Dötting (DE)

( * ) Notice: Subject to any disclaimer, the term of this patent is extended or adjusted under 35 U.S.C. 154(b) by 171 days.

(21) Appl. No.: 11/815,229

(22) PCT Filed: Feb. 10, 2006

(86) PCT No.: PCT/EP2006/050846
§ 371 (c)(1), (2), (4) Date: Aug. 1, 2007

(87) PCT Pub. No.: WO2006/087298
PCT Pub. Date: Aug. 24, 2006

(65) Prior Publication Data
US 2008/0141914 A1    Jun. 19, 2008

(30) Foreign Application Priority Data

Feb. 17, 2005 (DE) .......................... 10 2005 007 521
May 3, 2005 (DE) .......................... 10 2005 020 563
Aug. 3, 2005 (DE) .......................... 10 2005 037 114

(51) Int. Cl.
| A01B 9/00 | (2006.01) |
| A01C 5/00 | (2006.01) |
| A01C 7/00 | (2006.01) |
| A01C 9/00 | (2006.01) |
| A01C 13/00 | (2006.01) |

(52) U.S. Cl. ........ 111/160; 111/162; 111/171; 111/197; 172/72; 172/123; 172/169; 172/200; 172/438; 172/684.5

(58) Field of Classification Search .................. 172/681, 172/35, 63, 71, 72, 118, 122, 123, 133, 169, 172/195, 200, 201, 438, 518, 684.5, 776; 111/149, 157–162, 170, 171, 190, 197
See application file for complete search history.

(56) References Cited

U.S. PATENT DOCUMENTS
3,905,313 A * 9/1975 Grether .......................... 111/200
(Continued)

FOREIGN PATENT DOCUMENTS
DE         7148064       3/1972
(Continued)

OTHER PUBLICATIONS
International Preliminary Report on Patentability, Sep. 26, 2007.
(Continued)

*Primary Examiner* — Christopher J. Novosad
(74) *Attorney, Agent, or Firm* — Dority & Manning, P.A.

(57) ABSTRACT

The invention relates to a combine agricultural machine (1) comprising a planting device (3), in particular a potato planting device, provided with at least one storage container (10), an extraction device associated thereto, a setting plow (7) and an downstream mounted end damming device (4). A loosening tool (2) for preparing a seedbed is arranged upstream of the planting device (3) in a travelling direction and one or several wheels (18) for disintegrating soil and supporting the machine are mounted upstream of said loosening tool (2) in said travelling direction. The invention also relates to a method for mechanically planting seeds comprising a stage for preparing the seedbed, a sowing stage and a final damming stage which are simultaneously carried out by means of tools mounted on the agricultural machine (1). At the beginning, the wheels (18) of the machine pass along the soil to be processed for homogeneously disintegrating and breaking it, afterwards the seedbed is prepared by the loosening tool (2) wherein the seeds or seedstock are distributed and the end damming is carried out.

18 Claims, 6 Drawing Sheets

U.S. PATENT DOCUMENTS

| | | | | |
|---|---|---|---|---|
| 4,258,635 | A | * | 3/1981 | Lutz et al. ................. 111/52 |
| 4,518,046 | A | | 5/1985 | Rettig et al. |
| 5,769,170 | A | * | 6/1998 | Skjaeveland ............. 172/142 |

FOREIGN PATENT DOCUMENTS

| | | | |
|---|---|---|---|
| DE | 29 00 985 | | 4/1980 |
| DE | 2900985 B1 | * | 4/1980 |
| DE | 43 14 234 C2 | | 11/1994 |
| DE | 295 11 463 U1 | | 11/1995 |
| DE | 197 10 036 A1 | | 10/1998 |
| DE | 197 10 036 C2 | | 10/1998 |
| DE | 19710036 A1 | * | 10/1998 |
| DE | 298 14 121 U1 | | 11/1998 |
| DE | 200 00 716 U1 | | 7/2001 |
| FR | 2 769 459 | | 4/1999 |
| FR | 2769459 A | * | 4/1999 |
| GB | 2 079 572 | | 1/1982 |
| GB | 2079572 A | * | 1/1982 |
| GB | 2 128 066 | | 4/1984 |
| NL | 1014691 C2 | * | 9/2001 |
| NL | 1014691 | | 11/2001 |
| RU | 2 105 452 | | 2/1998 |
| SU | 37409 | | 10/1933 |
| SU | 1358804 | | 12/1987 |
| SU | 1521332 | | 11/1989 |
| SU | 1521333 | | 11/1989 |
| SU | 1613023 | | 12/1990 |
| SU | 1812919 | | 4/1993 |

OTHER PUBLICATIONS

PCT Search Report, Apr. 26, 2006.
German Patent Office Search Reort, Dec. 15, 2005.
Office Action Issued in Corresponding Chinese Application, Jul. 17, 2009 (Translation).
Office Action Issued in Corresponding Russion Application (Date Unknown) (Translation).

* cited by examiner

COMBINED AGRICULTURAL MACHINE

FIELD OF THE INVENTION

This invention refers to a combined agricultural machine that includes a planting device and a downstream-mounted final damming device. The planting device may be a potato planting device with at least one storage container, an extraction device associated thereto, and a setting plow.

BACKGROUND

Such agricultural machines that combine the working process of planting and damming building in one single machine are known from current technology. The best examples are potato planting machines equipped with various tools for final damming (for example, with ridge elements for sole application, with ridge elements and cage drum rollers or also combined with a dam-forming sheet metal). In this case, the seedbed preparation for cultivation must be carried out in one separate work process with the help of a rotary harrow. However, these machines can only be used in light to medium soils, whereas in heavier soils sufficiently small soil fractions can't be achieved for the damming structure. Therefore, in heavier soils the final damming must be expanded by another work process that includes a damming rotary hoe. The subsequent hoeing of the dams in another work cycle can cause a lateral mismatch, so that the location of the plant tubers can be significantly off-center from the dam, which may lead to a lateral growing out of the tuber nests. This problem occurs especially when a lateral slope is being tilled.

To solve this problem, DE 197 10 036 describes a laying machine in which a damming rotary hoe has been placed on a machine frame right behind the furrow markers. The combination of planting machine and damming rotary hoe to one single combined machine eliminates the problem of lateral mismatch. In addition, this design already takes care of two work cycles, resulting in fuel economy and an increase in harvest yield by reducing the green proportion of the harvest caused by sunshine. Such machines can also be used in heavy soils. However, a previous work cycle for seedbed cultivation remains essential with this design. The subsequent driving over of the tilled soil by a planting machine, by a dam-forming machine or by the combined machine described here, however, will once again compact the already loosened soil.

Therefore, the task of the invention is to suggest a machine that will make it possible to bundle the work cycles even more and also to compact the already loosened soil only very little.

SUMMARY

Objects and advantages of the invention are set forth in part in the following description, or may be obvious from the description, or may be learned through practice of the invention.

A combined agricultural machine includes a planting device, for example especially a potato-planting device, and a downstream mounted final damming device. The planting device consists at least of one storage container, an extraction device associated with it, and a setting plow. A loosening tool for seedbed tilling is placed in the plowing direction before the planting device. Furthermore, one or more wheels for disintegrating the soil and supporting the machine are mounted before said loosening tool in the plowing direction. On the other hand, after the loosening tool, the machine has no more wheels. Thanks to the placement of a loosening tool before the machine's planting device, a previous work cycle for soil cultivation can be eliminated. In this case, according to the invention, no more wheels supporting the machine have been placed in the plowing direction after the loosening tool, so that a subsequent compacting of the already loosened soil will no longer take place.

One or more wheels for disintegrating the soil have been placed before the loosening tool in the plowing direction. This causes the soil clods to be crushed and disintegrated, thereby considerably facilitating the subsequent planting and damming formation. A lateral mismatch that leads to an off-center depositing of the plants being planted in the dams is also eliminated by the placement of the tools in one machine. This also improves the soil's crumb structure.

A preferred execution design of the machine provides an extraction device as a rotating bucket chain conveyor. This execution makes it possible to achieve an especially compact machine design.

If the rotating bucket chain conveyor is driven by a spring-loaded roller that makes contact with one profile of the wheels, then a space-saving and favorably balanced arrangement of the rotating bucket chain conveyor and the storage container for the seeds is possible. In addition, the driving mechanism of the rotating bucket chain conveyor can work without slippage. If the machine is lifted, the roller no longer makes contact with the wheel profile, thus causing the rotating bucket chain conveyor to stop.

Furthermore, it is advantageous if the loosening tool has been designed as a rotating harrow, thus facilitating the loosening of heavy soils as well. However, an alternative execution would have a spike tooth rotating mechanism.

Another advantageous subsequent execution of the invention provides ridge bodies or covering disks to be allocated to the planting device, which already pre-shape the dam to be built. However, since no more subsequent soil compacting takes place with this wheel arrangement in the machine according to the invention, they are not necessarily required any longer.

A particularly advantageous execution form of the invention provides that a dam-forming sheet metal is placed behind the planting device for building the final damming. With this execution, particularly solid and smooth dams can be achieved, thereby creating optimum growing conditions. If the inclination of the dam-forming sheet metal can be changed, then dam height and flank inclination can be adjusted.

Another further execution of the invention provides the setting plow to be developed as a double plowing disk. Plant residues in the soil can be cut up by the plowing disk and incorporated into the soil. If a comb breaker is added to the double plowing disk, then an especially precise seed deposition can be achieved.

It is also advantageous if the setting plow is connected to the final damming device, especially to a dam-forming sheet metal, in a way that its height can be adjusted and, thus allowing one to easily plant the seed stock at the same depth with respect to the dam crest.

Advantageously, the machine has been executed as an extruded machine with its own driving mechanism.

Preferably, the wheels of the machine should be equipped with wide tires to cover most of its tilling width. This design allows the wheels to squash and disintegrate the soil clods to achieve optimum cultivation. Owing to the lower pressure, the use of wide tires protects the soil and plants and excessive soil compacting by the wheels does not take place. Thanks to the wide tires, the machine does not sink as deeply into the soil, thus achieving a mostly uniform plant depth. Preferably, four wheels are arranged in the machine's width direction, which results in a four-lane design of the machine.

If the wheels of the machine are hung in a pendulous manner, then exact depth guidance and centric seed deposition are achieved in uneven soils or in lateral slopes as well.

Besides, if the machine is arranged in multiple rows, it can be advantageous if it can be coupled to a tractor and rotated by 90° when driven on the road. In this case, the wheels of the machine are arranged in such a way that they can be swayed by 90° on the machine. This makes it also possible to drive the machine over a wider working area and still be able to comply with the maximum permissible road driving width.

In accordance with another favorable execution of the invention, it is advantageous if a roller for disintegrating the soil is arranged before the loosening tool. Even as a result of this, exact depth guidance over the entire cultivation width and a favorable crumbling of the soil and disintegration of the clods can be achieved.

A particularly compact design of the machine can be achieved if the storage containers of the planting device are placed over the loosening tool and the machine's center of gravity is located near the wheel axis. Supporting wheels (arranged in traveling direction after the loosening tool) for compacting the soil that was already loosened once again, would not be needed in this case. Preferably, the storage container should be arranged as a hydraulic tilting bunker. This makes an optimal weight distribution possible while still ensuring a constant supply of seed stock.

Another advantageous execution form of the invention provides the loosening tool to be detachable from the machine for use in other machines. In this case, the loosening tool can also be used for other tilling methods regardless of the combined planting machine.

It is also advantageous if the planting device is designed so it can be detached from the machine. This also makes it possible to mount various planting or seeding devices on the machine as well as to use only the machine's loosening device.

To dismount the planting device from the machine, it is especially advantageous if the storage container with the extraction device, the setting plow and the device for the final damming building form one single design unit. Then, the latter can be detached as such from the combined agricultural machine and be replaced by another seeding device.

In particular, instead of the planting device, a seeding device for grain (such as a seed drill) can be mounted on the machine, which would comprise at least one storage container, an extraction device for seed stock, a sowing beam and a packing roller. If the components are correspondingly designed, a conventional sowing machine can also be employed in this case.

It is also advantageous if a single-grain-seeding machine is arranged in the machine as a planting device or can be mounted on it. It is advantageous for this if the storage container with the extraction device forms a detachable unit that can be arranged on the combined machine.

If the single-grain seeding machine includes a dam-forming sheet metal, then the seeding can also take place as a single working cycle together with the building of the damming structure. If a sowing beam of the single-grain seeding machine is placed in a recess of the dam-forming sheet metal, then the seeds can be directly brought into the dam just created, with which a very precise depth guidance can be achieved.

In accordance with another advantageous execution, it is provided that the machine is designed as a bagger for connection to a tractor.

It is also possible to combine the machine with a tractor, in which case the loosening tool is directly placed on the tractor. Therefore, the machine would have no driving mechanism of its own. The depth guidance of the tools can be achieved in this case through roller feelers, for example.

In accordance with another advantageous further design of the machine combined with a tractor, the tractor in operation essentially bears only the weight of the storage container. In this case, a convenient construction can achieve weight distribution in which the tractor barely bears the load of the mounted machine, while the device for the final damming stage is advantageously burdened.

Additionally, more tools (especially tools running ahead) can be arranged on the machine. For example, it would be advantageous if a grading rail or spring tine is arranged. A manure spreader can also be arranged as an additional tool. This would preferably be arranged over the entire working width so that the manure can be deposited and incorporated depending on the distance covered. This can result in the savings of an additional working process, something that would contribute to fuel economy. In addition, the manure can be brought almost directly out to the seed deposit spot, thus improving effectiveness.

A particularly advantageous subsequent development of the invention provides that the plant material supply into a scoop chamber is controlled depending on the filling level of the scoop chamber. Advantageously, the planting device has for this purpose a device for registering the filling level in the scoop chamber. This allows one to always have a uniform supply of plant material in the scoop chamber, with which a very uniform occupancy in the individual laying buckets of the extraction device is achieved. This makes it possible to reliably prevent double occupancy and defective spots.

It is also advantageous if the planting device includes a conveying device for transporting plant material out of the storage container to the scoop chamber. If in this case, and in the case of a multiple-row machine, one joint conveying device is assigned to every two rows, then a particularly uniform transport of plant material to the scoop chambers of the individual rows is achieved.

In a process for mechanical seed output, the working processes of seedbed preparation, sowing and final damming take place through tools arranged in an agricultural machine. According to the invention, the working processes mentioned are carried out simultaneously in a single working process. In this case, the machine's wheels are first driven over the soil to be tilled in order to disintegrate and crumble the soil uniformly, thereby facilitating the subsequent planting and the building of the dam structure in particular. Afterwards, the seedbed is prepared for cultivation with a loosening tool, the seeds or plant materials are brought out and finally the final dam is built. In this case, the machine's wheels impact the soil only before the latter is loosened. This can effectively prevent a damaging re-compacting of the soil near the driving lanes. Since the wheels crumble the soil uniformly, an especially practical and fine crumbling structure can be achieved, so that this process can also be carried out on heavy soils.

A particularly uniform disintegration of the soil can be achieved if the machine's wheels can be driven over almost all the agricultural machine's width for cultivation preparation. This can be achieved, for example, if the machine is equipped with wide tires, which exert only a small pressure on the soil.

BRIEF DESCRIPTION OF THE DRAWINGS

Additional advantages of the invention are described in connection with the execution examples. It is shown in.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
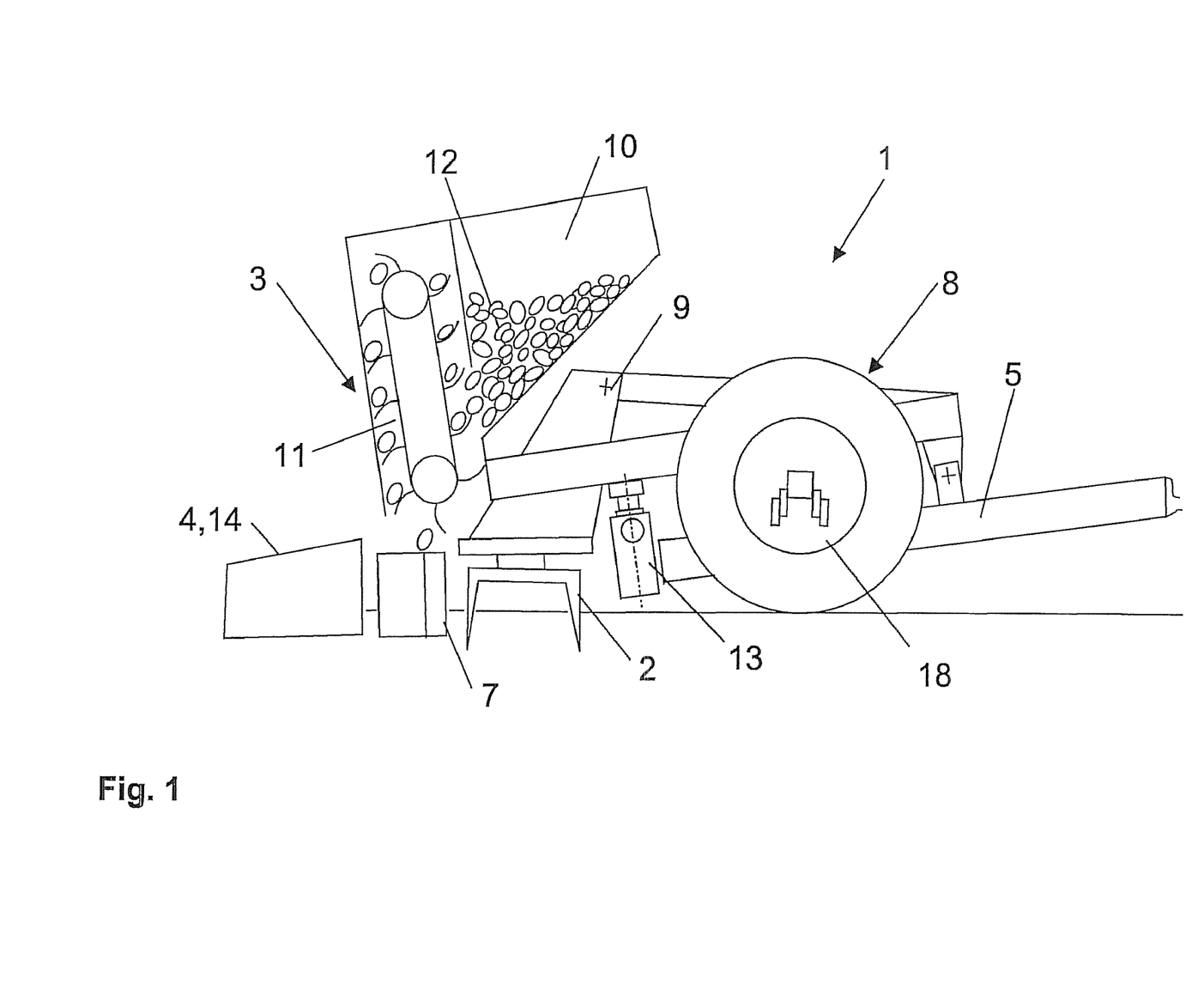
FIG. 1 A diagrammatic view of a combined machine according to the invention in a lateral view in dragged version, FIG. 2 A diagrammatic front view of the machine according to the invention with pendulous wheel suspension in profile, FIG. 3 A diagrammatic top view of a machine according to the invention with swiveling wheels, FIG. 4 A diagrammatic view of a machine according to the invention as a lifting machine, FIG. 5 An additional embodiment of a machine according to the invention with an improved planting device, FIG. 6 An additional embodiment of a machine according to the invention, in which a seeding device for grain has been arranged, FIG. 7 A diagrammatic view of a dam-forming sheet metal, to which a height-adjustable blade has been attached.

FIG. 1 shows a lateral view of a combined agricultural machine 1 according to the invention in a dragged version. The machine 1 has a loosening tool 2, a planting device 3 and a final dam building device 4. The devices are arranged on a common support framework 5, with which the working processes of seedbed preparation, sowing and final damming can be joined together in one single working process. We see the combined machine 1 designed as a dragged machine with its own driving mechanism 8. However, a construction as a directly attached lifting machine is also possible. We see here a loosening tool 2 provided as a circular self-cleaning harrow, which makes an especially good cultivation of the seedbed possible. In this case, the harrow has been constructed with a conventional add-on attachment 9 so that it can be detached for use in another machine. The loosening tool 2 is followed by a planting device 3, arranged subsequently in traveling direction, which is designed here as a bucket-laying machine. A hydraulic cylinder 13 has the function of lifting the machine.

The planting device 3 consists of a hydraulic tilting bunker acting as storage container 10 for seeds, a rotary bucket structure 11 for the scattering and transporting of the seeds and a setting plough 7. The plant material, especially seed potatoes 12, is deposited through the bucket structure 11 in one of the furrows pulled by the plowshare. The plowshares can be constructed as height-adjustable double-disk plowshares, for example, but other designs are possible as well. Possibly available plant residues from winter greening, for example, are cut up by the disk plowshare and therefore cause no obstructions. In order to break the remaining soil ridge located between both plowshare disks and achieve a centric deposition of the tubers, a height-adjustable comb breaker has been placed between both disks (not shown here). A hydraulic cylinder can tilt the storage container in place, thereby making possible a constant transport of the plant material 12.

Here, a dam-forming sheet metal 14 of the planting device 3 has been subsequently arranged for the final damming building stage to provide a stable final damming structure in a single working process with seedbed cultivation preparation and planting. According to the invention, in this case no subsequently arranged wheels 18 in the loosening device 2 are needed due to the compact design of the machine 1, as is the case in known machines of the state of art. In accordance with machines of the state of art, the seedbed cultivation preparation takes place in one separate working process before planting. Afterwards, the planting machine is driven over the previously loosened soil (and frequently the rotary cultivator is also subsequently driven over it as well), in which case the wheels of the corresponding machines compress and compact the previously loosened soil.

Therefore, according to the invention, in this machine 1, wheels 18 for supporting the machine 1 are placed only in traveling direction before the loosening tool 2, made possible by the compact design of machine 1. The present machine 1 is equipped with wide tires 15 that almost cover the entire tilling preparation width of the machine 1. The significantly larger tire contact surface exerts only a very slight pressure on the soil that is well below 1 bar, so that the machine's wheels 18 placed before do not cause any appreciable soil compacting. In addition, the driving over of the entire preparation cultivation width uniformly crumbles the soil and disintegrates the soil clods. If arranged correspondingly, the remaining small soil ridges between the wheels are driven over by the tractor's wheels, so that the weight is uniformly distributed over the entire working width. The disintegration and crumbling of the soil, plus the prevention of subsequent compressing by the machine's wheels, greatly facilitate the final damming stage. Furthermore, the wider tire contact surface makes it possible to achieve a constant planting depth, which is largely independent from the filling level of the storage container 10. Shown here is a design of the machine 1 with four wheels 18 equipped with wide tires to allow road driving. However, instead of the wheels 18, only one roller that covers the entire working width can be arranged.

To achieve a compact construction of the machine 1, the storage container 10 is placed above the loosening device 9. The placement of the storage container 10 according to the invention allows the center of gravity of the machine 1 to be displaced towards the front in traveling direction, so that no more additional wheels 18 are needed behind the loosening tool 2. Since the placement of the wheels 18 according to the invention does not allow any more subsequent compacting of the soil, a dam-forming sheet metal 14 can be added on directly to the planting machine 3, in which case uniform, smooth and stable dams can also be achieved in heavy soils.

In the embodiment shown, a bucket-laying device forms the machine's planting device 3. Likewise, however, a conveyor belt device can be added instead of the bucket-laying device.

Figure 2:
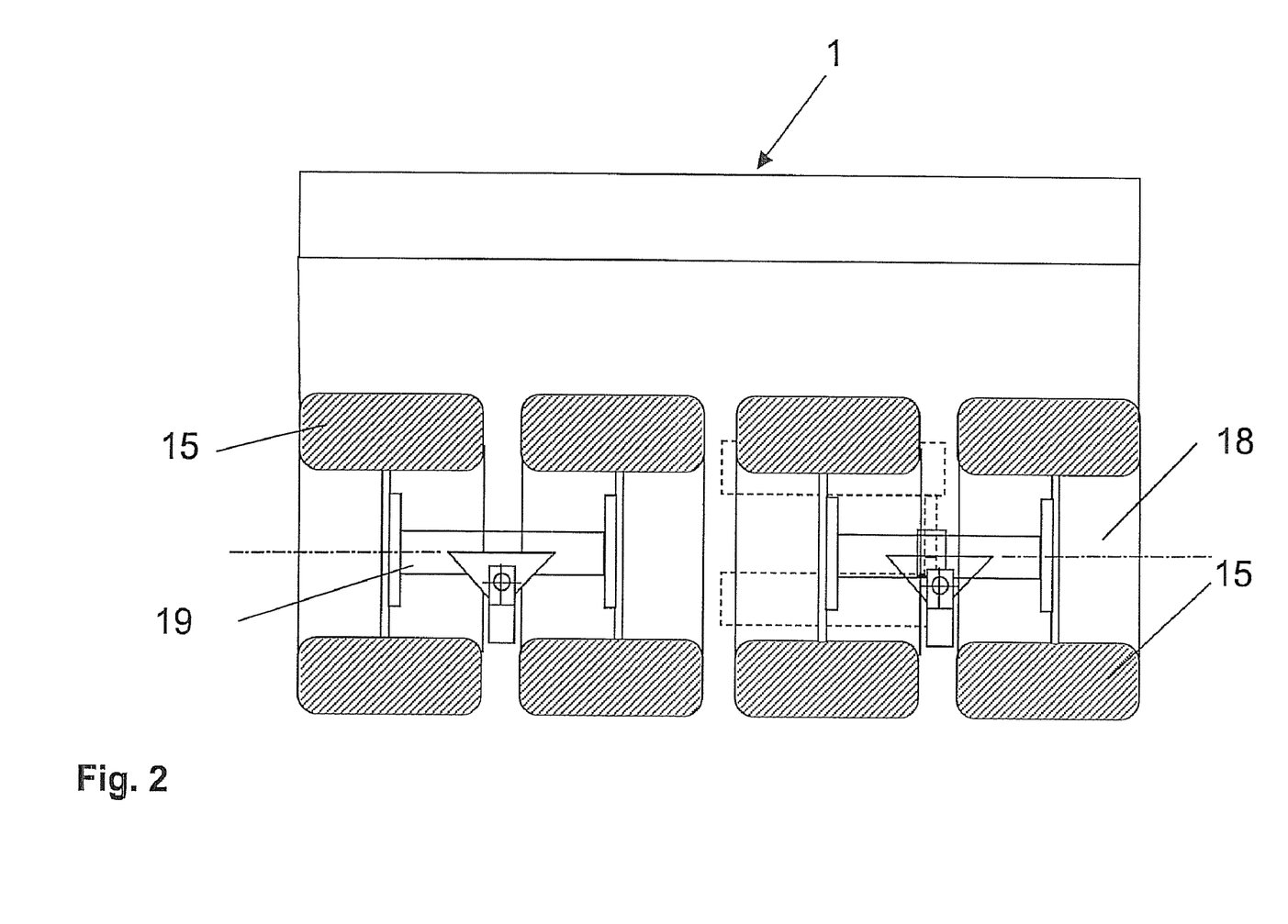

FIG. 2 shows a diagrammatic front view of the machine 1 according to the invention with a pendulous wheel suspension. The wheels 18, every two of them connected by a joint axis 19, are supported pendulously in the supporting frame for this. This arrangement makes a more exact depth guidance possible in uneven soils too, something that otherwise would only be achieved with a roller.

Figure 3:
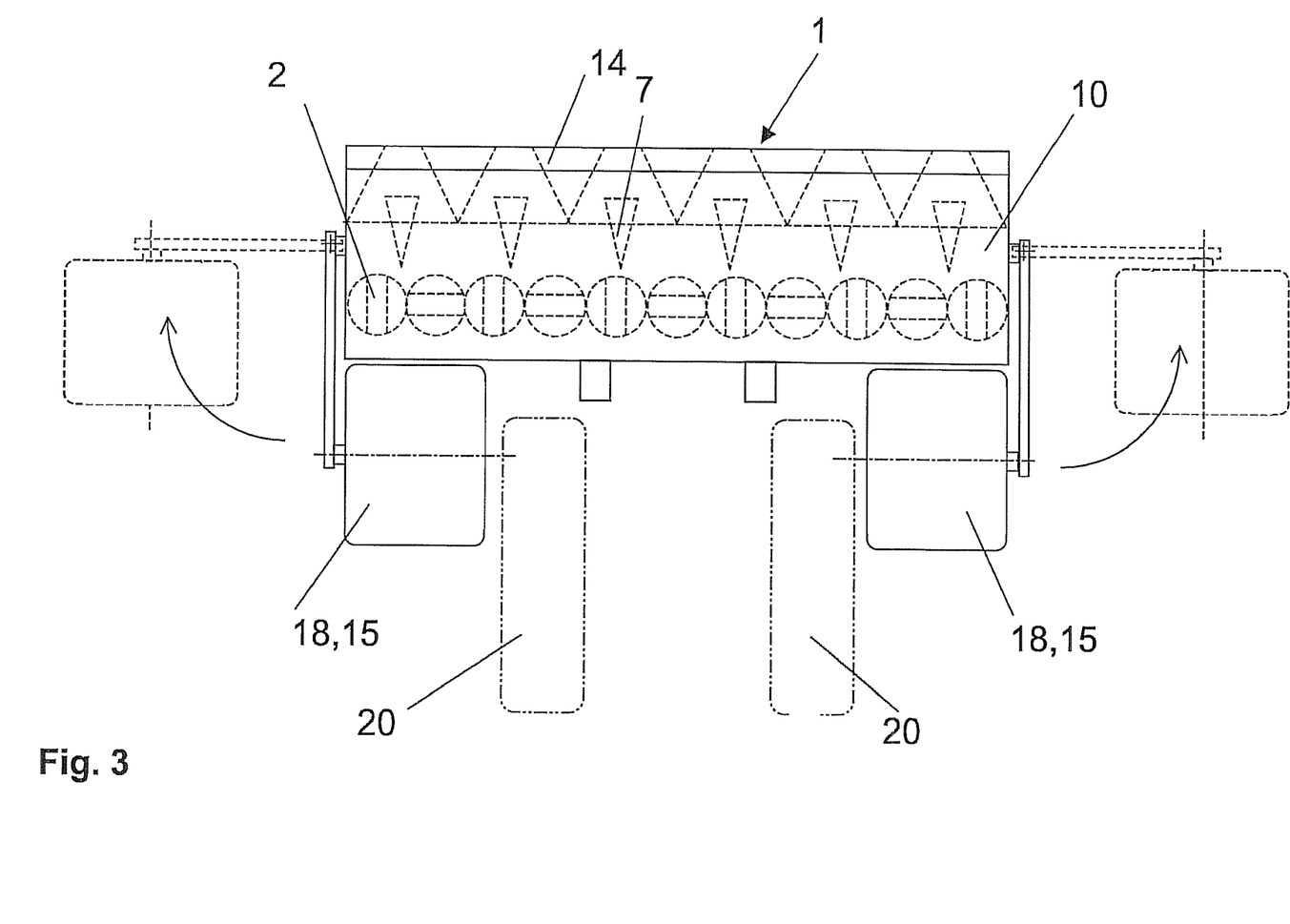

FIG. 3 shows a diagrammatic top view of another favorable embodiment of the machine 1 according to the invention with swiveling wheels 18. Since a multiple row version of the machine 1 surpasses the working or path width of the tractor, it is possible for example to place two wide tires 15 for depth guidance and re-compacting of the soil in such a way on the machine 1 that they will mostly be located beside the tractor wheels 20 shown here as dots and dashes if the machine 1 in operating position is coupled to the tractor. In order not to exceed the maximum allowable width for road driving, the wheels 18 can be swiveled by 90° towards the corresponding traveling direction (broken lines in the diagram). This allows one to couple the machine 1 to a tractor by displacing its direction by 90°. In order to achieve this, a side of the machine 1 has been advantageously lifted with the tractor.

Nevertheless, in working position almost the entire working width of the machine 1 is driven over, since the tractor's wheels 20 drive over the space between the wheels 18 of the machine. Only the back wheels of the tractor are hinted at here. Such a machine 1 is suitable both for multiple-row designs and for conventional four-row designs. In the four-row design it is also possible to widen the dam width as a result of this, since the maximum allowable width for road driving does not restrict the working width any longer.

Figure 4:
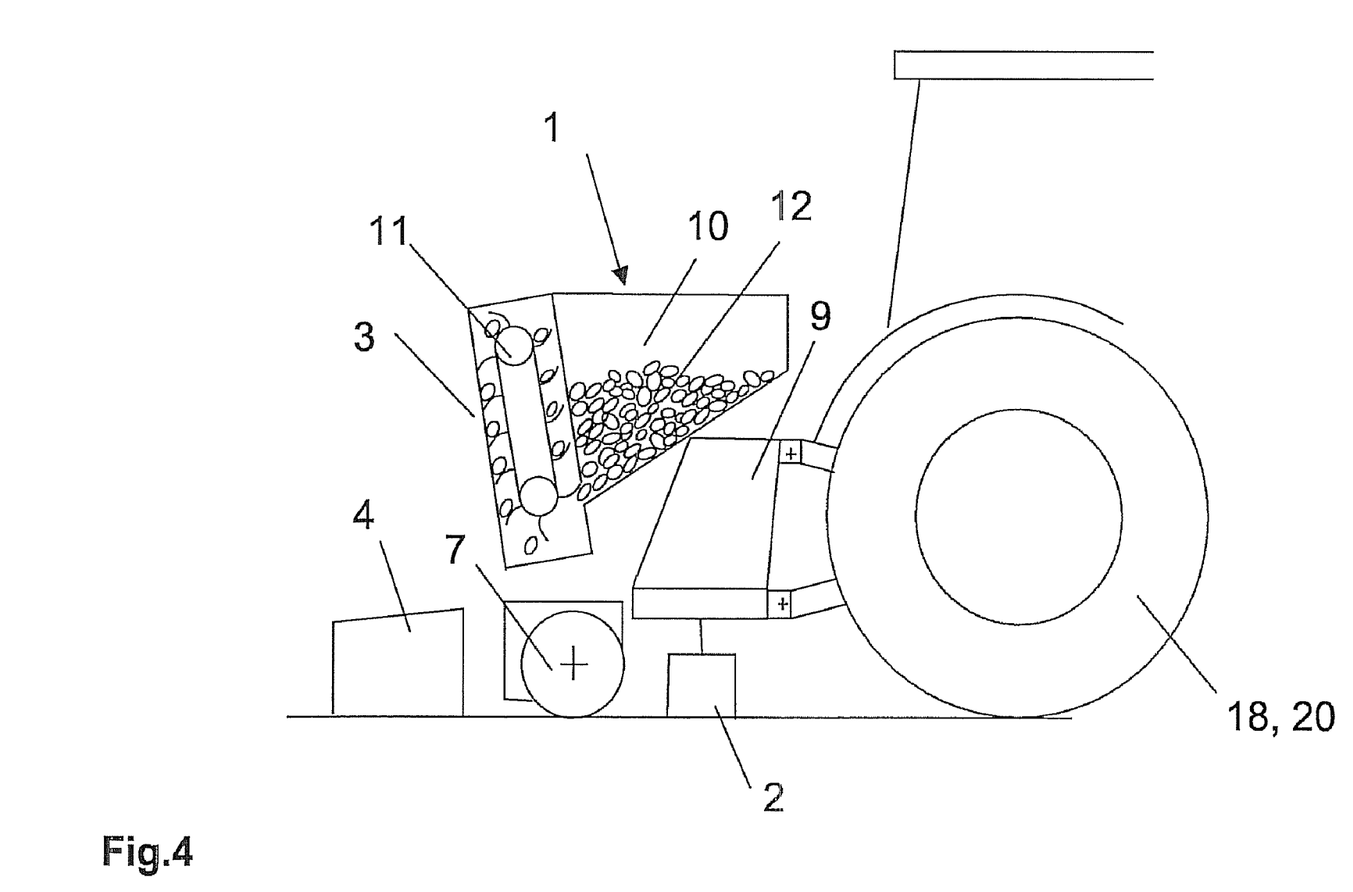

FIG. 4 shows a diagrammatic view of a machine 1 according to the invention as a lifting machine. Here, the machine 1 has been combined with a tractor and has no driving mechanism 8 of its own. Because of this, the machine 1 can also be designed in an especially compact way. The machine 1 can be added on to the tractor as a lifting machine, in this case through the respective arrangement of the components of the machine 1 it can be achieved that the weight of the addition in operating position will have a largely neutral effect on the tractor. By and large, the tractor carries only the weight of the storage container 10 because most of the weight of the addition is supported by the dam-forming sheet metal 14. This makes it possible for the dam-forming sheet metal 14 or the device for the final building of the damming 4 to carry the weight favorably, thus leading to an improved final damming stage. This design has a positive effect especially if the filling level of the storage container 10 is low.

For road driving, the machine 1 can be lifted by the tractor's hydraulic addition. Thanks to the compact design and the possibility of a hook-up in a conventional tractor, this machine 1 can be manufactured economically and is therefore also useful for small farms.

Figure 5:
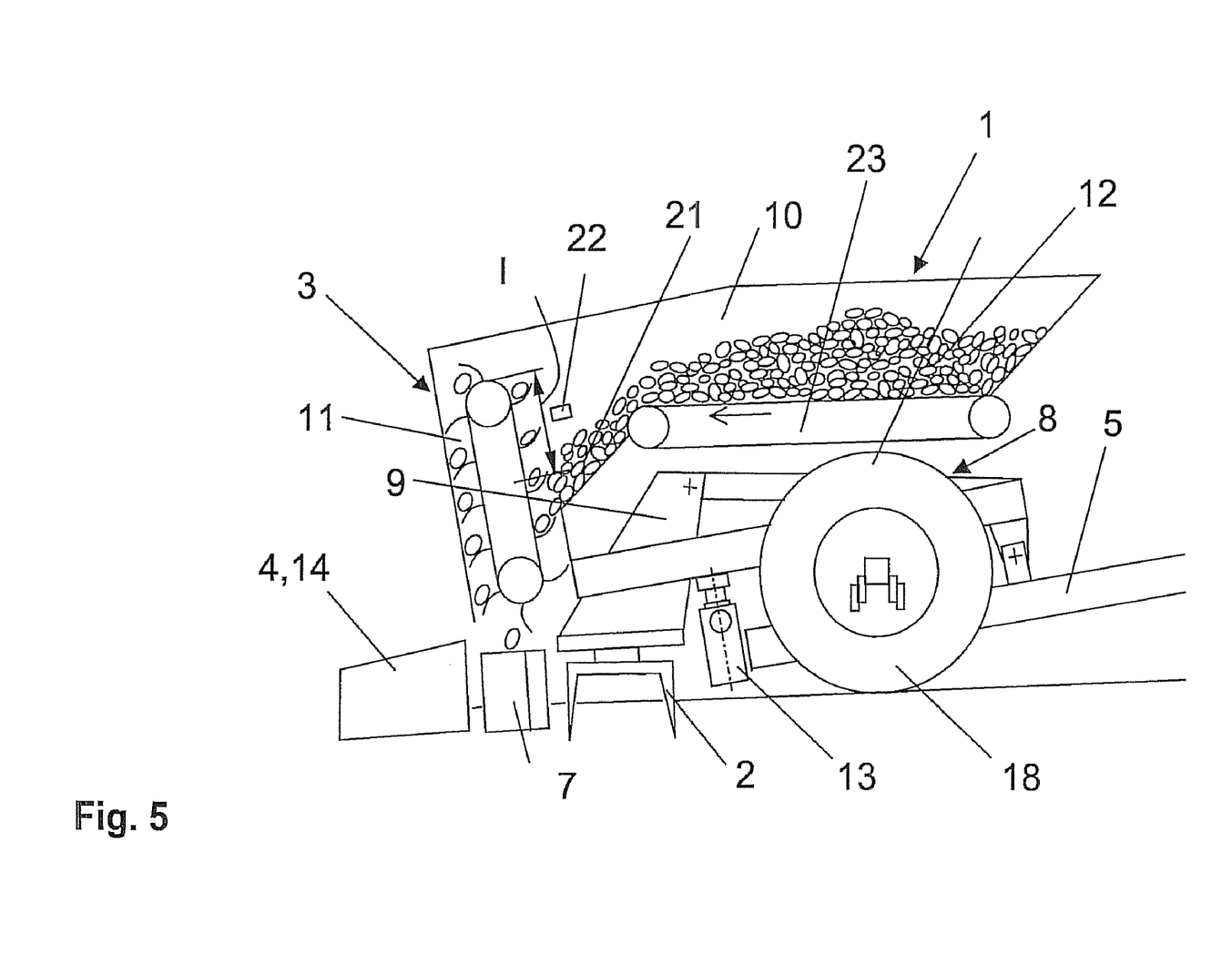

Another embodiment of a machine 1 according to the invention with an improved planting device 3 is shown diagrammatically in FIG. 5. In accordance with this illustration, the planting device 3 consists of a firmly arranged storage container 10 to which a scoop chamber 21 for the plant material 12 has been allocated. Even here, the planting device 3 has a rotating bucket structure 11 that acts as an extraction device. According to this embodiment, the planting device 3 is equipped with a device for registering the filling level in the scoop chamber 21, which can be designed as an optical sensor 22, for example. This device makes it possible to regulate the filling level in the scoop chamber 21 depending on how much the level of the scoop chamber 21 is filled, thus achieving a generally uniform, optimal height of the filling level. Furthermore, this also allows the length l of the vibrating section to have the same length all the time. The vibrating of the plant material 12 on the vibrating section prevents multiple occupancies of the individual laying buckets of the extraction device.

In the known devices according to the state of art, the height of the filling level in the scoop chamber 21 depended on the stock of plant material 12 in the storage container 10. As a result of this, the length of the vibrating section l depended on the remaining stock of plant material. A high level in the scoop chamber 21 leads to double occupancies in the individual laying buckets of the extraction device owing to a vibrating section that was too short, while in case of a low filling level, defective spots were to be expected. A correction of the adjustments in the vibrating aggregate during operation was possible only in a very limited way.

In the diagram shown, the constant height of the filling level in the scoop chamber 21 is achieved through a conveyor device 23 that interrupts the supply of plant material 12 into the scoop chamber 21 as soon as a pre-adjusted, optimal filling level is reached. As a result of this, an optical control of extraction device occupation by the user is no longer needed with this technical advancement. The driver of the tractor can see the control and occupancy of the laying buckets while driving.

In order to achieve in multiple-row machines 1 as much as possible a uniform distribution of plant material 12 in the individual rows, two or more conveyor devices 23 are advantageously arranged beside each other in the storage container 10. It is especially advantageous if the scoop chamber 21 of both rows is loaded by a joint conveyor device 23. As a result of this, all scoop chambers 21 of the machine 1 are largely uniformly supplied with slight construction expense.

In the example shown, a bucket laying structure 11 is provided as an extraction device, but a belt laying structure can also be arranged. In addition, one conveyor device 23 per row or extraction device can also be arranged as well, but this would increase the construction effort and expense.

Since the machine 1 according to the invention lacks wheels that will compress the soil afterwards, it is possible to put together the working processes of seedbed preparation, planting and dam formation in a one single process in one machine. As a result of this, significant fuel and cost-intensive working hours are saved. Since in this case no separate loosening tool for seedbed preparation is placed before it, tractor hours are saved as well. The harvest yield can be increased through the machine combination according to the invention, since a constant planting depth and a precise centric deposition of the plant material 12 takes place. Especially in lateral slopes, a non-centric mismatch of the plant material 12 deposition spot can no longer occur. The constantly centric deposition of tubers makes it possible to prevent almost all the green share of the harvest.

Since the tools in the combined machine 1 are arranged on a supporting structure 5, expenses can also be lowered compared to individual machines. Besides, with the unification of the tree working processes in one single machine, the risk of adverse meteorological conditions can be largely prevented, since there is no longer a temporal mismatch between the individual working processes. Since owing to the combined machine 1, no more significant soil compacting takes place, the crop yield of the preliminary bed can be increased considerably.

Figure 6:
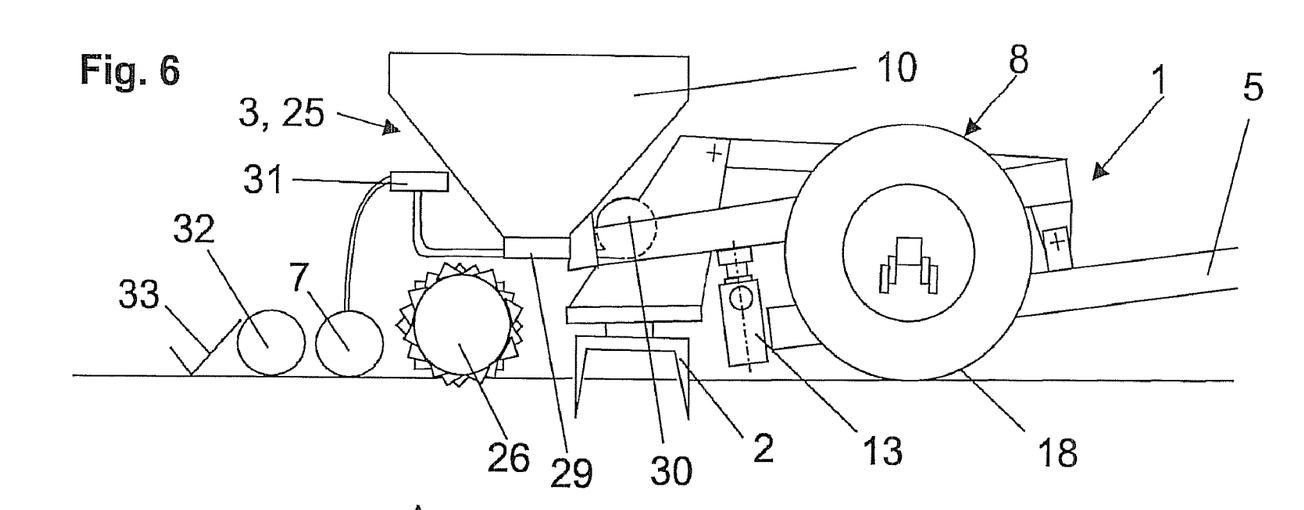

FIG. 6 shows another embodiment form of the machine according to the invention in which a seeding device 25 has been placed as a planting device 3, here a drill seeder for grain seeding. In this case, the combined agricultural machine 1 has been constructed in such a way that different planting or seeding devices can be added on to the machine via the corresponding mounting device or other additional devices. Instead of the structural unit shown in FIG. 1 (which comprises a storage container 10, the extraction device 11, the dam-forming sheet metal 14 and the setting plow 7), according to the diagram shown here, a drill seeder for seeding grain has been added on to the machine 1. According to this diagram, the seeder also includes a storage container 10, an extraction device for the seeds consisting of a metering unit 29 and a fan 30 to transport the seeds to a distribution head 31 and a sowing rail with several setting plows 7. If the individual components are adapted to each other in the construction, a conventional seeding device can be added on to the combined agricultural machine 1 or mounted on top of it. Furthermore, the seeding device 25 includes a packing roller 26 to achieve a re-compacting of the soil needed for grain seeding. In addition, and according to the diagram shown, the seeding device also includes a pressure roller 32 and a currycomb 33 in the seeding device 25 to close the seed furrow. However, it is also possible to add other planting or seeding devices 3, 25 on to the machine 1. It would be especially advantageous to add individual grain seeding devices on to the agricultural machine 1. In order to do this, the dam-forming sheet metal 14 (possibly with a setting plow 7 placed on it) can be arranged on the machine for replacement purposes so that different dam-forming sheet metals can be used depending on requirements.

Figure 7:
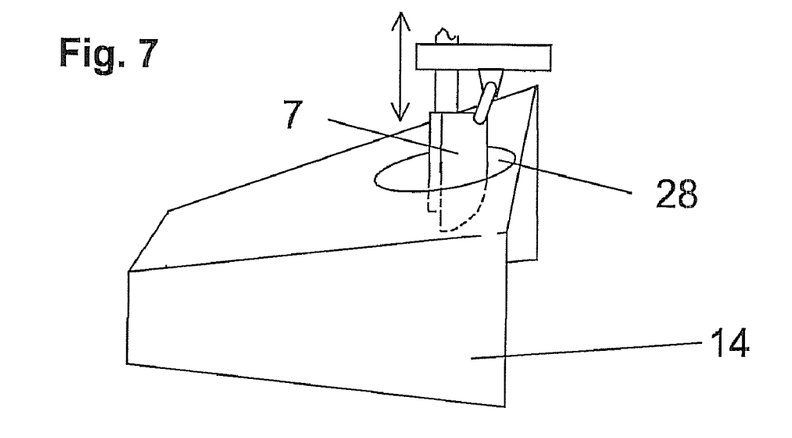

FIG. 7 shows a diagrammatic view of a dam-forming sheet metal 14 in which the (adjustable) setting plow 7 is added on to it. If the (height-adjustable) setting plow 7 is placed on the device for the final damming building stage 4, then a particularly exact seed deposition at a constant depth can be achieved.

In accordance with the view seen in FIG. 7, in this case the setting plow or sowing plowshare 7 is arranged in a recess 28 of the dam-forming sheet metal 14. As a result of this, it is possible to bring the seeds into the dam thus created, thereby allowing an extremely exact depth guidance to be achieved. This design is especially advantageous in combination with a single-grain seeder. It is becoming more popular to cultivate corn in dams as well, for example, since as a result of this a largely constant and uniform temperature level can be achieved within the dam. Therefore, with the dam-forming sheet metal 14 according to the invention, it is possible to build a dam in one single working process and also deposit the grain seedwhile also a fertilizer or phosphorus (if corn is planted) can be placed in the soil at the same time.

Therefore, the advantages of the combined agricultural machine 1 according to the invention are fully applicable to a grain seeder or to a single-grain seeding device, since a multiple driving over the soil to be prepared for cultivation is not needed any longer and there is no compacting in the area of the tractor's driving tracks. As a result of this, a particularly simultaneous bursting open of the seeds can be achieved, thus increasing crop yield. At the same time, the many different applications of the combined agricultural machine 1 often need only individual machinery parts to be built on it, so that it is possible to lower costs as well as a result of this.

The invention is not limited to the embodiments shown. For example, the machine can be built in a four-row design in other multiple-row versions or a belt conveying structure can be used instead of the bucket conveying structure. Likewise, other plant material or seed stock such as carrots or sugar beets can be planted with the machine apart from potatoes. The machine can be used not only as a planting machine, but also as a dam-forming one.

The advantage of the machine according to the invention is that after having built the dam, no more working processes are needed. Therefore, any number of desired dams can be laid out at any distance from one another. There is no danger of subsequent damage to the dam flanks or the product being created. As a result of this, wider tires than usual can be used in bed process cultivation. Additionally, ridge or covering layers can be laid out for facilitating the final dam building stage. Other modifications included within the scope of the patent claims are also part of the invention.

The invention claimed is:

1. An agricultural machine configured for seedbed preparation over a working width of the machine, sowing, and final damming, comprising:
   a planting device, said planting device comprising a storage container, an extraction device, and a setting plow;
   a loosening tool disposed in a traveling direction of said machine before said planting device;
   a damming device disposed in a traveling direction of said machine after said planting device; and
   a wheel configuration disposed in a traveling direction of said machine before said loosening tool, said wheel configuration configured for supporting said machine as it travels in the traveling direction and having a wheel surface width that spans substantially the entire working seedbed preparation width of said machine; and
   wherein said wheel configuration comprises a plurality of individual wheels having a combined width that defines the wheel surface width, groups of said wheels being pendulously suspended relative to said machine on an individual respective axis so that said groups separately contour to uneven soil beneath the wheel surface width.

2. The machine as in claim 1, wherein said extraction device comprises a rotating bucket structure driven by a spring-loaded roller engaged with said wheel configuration.

3. The machine as in claim 1, wherein said machine is void of wheels after said loosening tool in a traveling direction of said machine.

4. The machine as in claim 1, wherein said loosening tool is one of a rotating harrow or a comb tooth rotor.

5. The machine as in claim 1, wherein said damming device comprises a sheet metal configuration configured for producing a desired final damming structure in the soil.

6. The machine as in claim 1, wherein said setting plow comprises a double-disk plow configured with a comb breaker.

7. The machine as in claim 1, wherein said setting plow is height-wise adjustable relative to said damming device.

8. The machine as in claim 1, wherein said machine is configured for being pulled by another drive machine in operation thereof.

9. The machine as in claim 1, wherein said wheel configuration comprises a plurality of individual wheels having a combined width that defines the wheel surface width, said wheels rotatable by at least 90 degrees relative to said machine for conveying said machine lengthwise on a road.

10. The machine as in claim 1, wherein said storage container is disposed over said loosening tool, and a center of gravity of said machine is closer to said wheel configuration than to said damming device.

11. The machine as in claim 10, wherein said storage container comprises a hydraulic tilting bunker.

12. The machine as in claim 1, wherein either of said loosening tool or said planting device are dismountable from said machine as a unit.

13. The machine as in claim 1, wherein said planting device is configured as a seeding device, said storage container and said extraction device configured for seed stock, and a plurality of sowing plows configured on a sowing rail.

14. The machine as in claim 13, wherein said damming device comprises a sheet metal configuration, and said seeding device is a single grain seeding device disposed in a recess in said sheet metal configuration.

15. The machine as in claim 1, wherein said machine is configured for being pulled by a tractor, with the tractor bearing substantially only the weight of said storage container.

16. The machine as in claim 1, wherein said planting device comprises a scoop chamber upstream of said extraction device, and further comprising a sensor disposed to detect a fill level of material in said scoop chamber for regulating the fill level to a desired height.

17. The machine as in claim 16, wherein said planting device further comprises a conveyor device for transferring material from said storage container to said scoop chamber.

18. The machine as in claim 17, wherein said machine is configured as a multiple row machine, and further comprising at least one said conveyor for every two rows.

* * * * *